US 6,711,584 B1

(12) United States Patent
Wajda et al.

(10) Patent No.: US 6,711,584 B1
(45) Date of Patent: *Mar. 23, 2004

(54) METHOD TERMINAL DEVICE, NODE, PROGRAM MODULE, AND USER INTERFACE FOR THE DETERMINATION OF FEATURES REQUIRED FOR A COMMUNICATION RELATION

(75) Inventors: Wieslawa Wajda, Keltern (DE); Anne Kruchten, Boofzheim (FR)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/362,735

(22) Filed: Jul. 29, 1999

(30) Foreign Application Priority Data

Jul. 30, 1998 (DE) .......................... 198 34 321

(51) Int. Cl.⁷ ............................ G06F 7/00; G10L 15/04
(52) U.S. Cl. ..................................... 707/104.1; 704/254
(58) Field of Search .................................. 704/254, 275, 704/232; 379/88.22, 111, 200, 88.09, 88.11; 367/198; 399/111, 201, 224; 209/580–587; 455/31.1; 707/104.1

(56) References Cited

U.S. PATENT DOCUMENTS

| 3,851,109 A | * | 11/1974 | Downs et al. ............... 379/200 |
| 3,946,157 A | * | 3/1976 | Dreyfus ....................... 704/254 |
| 5,749,066 A | * | 5/1998 | Nussbaum .................. 704/232 |
| 5,893,058 A | * | 4/1999 | Kosaka ....................... 704/254 |
| 6,097,930 A | * | 8/2000 | Hill et al. ................... 455/31.1 |

FOREIGN PATENT DOCUMENTS

| DE | 3823914 A1 | 1/1990 |
| DE | 41 18 356 C2 | 12/1992 |
| EP | 0 281 102 A2 | 9/1988 |
| EP | 0 294 644 B1 | 12/1988 |
| EP | 0 306 855 A2 | 3/1989 |
| EP | 0 529 207 A1 | 3/1993 |
| JP | 2 270466 A | 11/1990 |
| JP | 3 101452 A | 4/1991 |

* cited by examiner

*Primary Examiner*—Uyen Le
*Assistant Examiner*—Te Yi Chen
(74) *Attorney, Agent, or Firm*—Sughrue Mion, PLLC

(57) ABSTRACT

A method, a terminal device, a node, a program module, and a user interface for determining features required for a communication relation. An input device (IN) determines initial features as input values (INPUT) which are necessary for classification of the communication relation and transmits them to a sort device (SORT) which sorts the initial features into feature groups, with the first feature group (INKP) comprising those of the initial features which concern at least two communications partners to participate in the communication relation; a second feature group (INDT) is comprised of those of the initial features which concern at least one data type to be transmitted in the framework of the communication relation; and a third feature group (INCT) which comprises those of the first features which concerning at least one connection type for the communication relation. The features sorted in this manner are transmitted to a processing device (MAT) which inputs them into a decision matrix and determines as output variables (OUTPUT) from this matrix the features required for the communication relation as second features.

20 Claims, 6 Drawing Sheets

DEC

| | S1 | S2 | S3 | S4 | S5 |
|---|---|---|---|---|---|
| RKP | | ADD 1 | ADD 2 | ADD 1 | ADD 1 |
| RDT | | VOICE | PICT | VOICE | PICT |
| RCT | | DIRECT | DELAY | DELAY | DELAY |
| ROUTPUT | | OUT 1 | OUT 2 | OUT 3 | OUT 4 |

DEC

| S1 | S2 | S3 | S4 | S5 |
|---|---|---|---|---|
| RKP | ADD 1 | ADD 2 | ADD 1 | ADD 1 |
| RDT | VOICE | PICT | VOICE | PICT |
| RCT | DIRECT | DELAY | DELAY | DELAY |
| ROUTPUT | OUT 1 | OUT 2 | OUT 3 | OUT 4 |

Fig. 2

METHOD TERMINAL DEVICE, NODE, PROGRAM MODULE, AND USER INTERFACE FOR THE DETERMINATION OF FEATURES REQUIRED FOR A COMMUNICATION RELATION

BACKGROUND OF THE INVENTION

This application is based on and claims the benefit of German Patent Application No. 198 34 321.3 filed Jul. 30, 1998, which is incorporated by reference herein.

The present invention concerns a method for determining features required for a communication relation, as well as a terminal device, a node, a program module and a user interface for this purpose.

If a communication relation with a communications partner is to be established, a suitable terminal must be selected for the desired communication relation and then the parameters necessary for the development of the communication relation must be inputted on the terminal. If, for example, a voice connection with a communications partner is desired, one will take a telephone and enter the telephone number of a telephone connection of the desired communications partner so that a connection can be created to the subscriber line over a telecommunications network.

The type of connection, namely a connection-oriented connection is already specified by the subscriber through the choice of a telephone as terminal device. The quality of the connection or the fees incurred for the connection are in any case predetermined through the selection of a certain type of telephone as source or also as destination of the connection, for example, through the selection of a telephone for a wire-bound telecommunications network or of a telephone for a mobile telecommunications network. If fax messages are to be sent on the voice connection instead of speech, a fax machine or a personal computer suitable for the sending and receiving of faxes will be used instead of a telephone as source and destination of the connection. Also in this case, a connection-oriented connection can be developed through the selection of a fax machine as terminal without consideration of the fact that the data to be transmitted possibly could also be sent with a desired or incidental time delay on a packet-oriented connection. An accidental time delay could be accepted, for example, if the transmission of faxes would then take place at lower fees or a time delay could even be desired because the destination of the connection could be prepared for reception of a fax only after such a delay.

Through the integration of different communication options into a single telecommunications facility, various telecommunication relations can be established from one such telecommunications facility. Thus, for example, through suitable interface systems and program modules, a personal computer can be expanded into such a telecommunications facility from which faxes, e-mails, internet communication, and even telephone conversations are possible. But even in the case of such a personal computer, for developing a communication relation, a user must first select a program module suitable for one of the aforementioned various communication relations and there must specify an address of a desired communications partner, for example a subscriber number or an e-mail address. Through the selection of a program module, it is established in such a case, for example, that a fax will be sent to the desired communications partner. In addition, however, it must be known to the user of the personal computer that the fax machine of the communication partner is ready to receive. Instead of sending a fax message, however, it could make more sense to send an e-mail to the communications partner, for example because it is possible at a more favorable cost or because the communications partner can receive only e-mails with the communication means which are available at the moment. In addition, the address at which the desired communications partner can be reached must be known. If such an address changes frequently, however, such as depending on the time of day, because the communications partner is at different places at different times, it is often impossible to have at hand the relevant address at a given time for establishing a communication relation.

SUMMARY OF THE INVENTION

The object of the invention is to determine in a simple, convenient manner features of a communication relation which meet the desired requirements at a given time so that the communication relation can be established based on these features or, in the event a communication relation already exists, to modify the communication relation in accordance with the desired requirements.

This object is achieved according to the present invention by a process wherein an input device (IN) determines initial features as input variables (INPUT) which are necessary for classification of the communication-relation, the input device transmits the initial features to a sort device (SORT), the sort device sorts the initial features into feature groups, whereby the sort device sorts into a first feature group (INKP) those features of the initial features which concern at least two communications partners to participate in the communication relation; whereby the sort device sorts into a second feature group (INDT) those features of the initial features which concern at least one data type to be transmitted in the framework of the communication relation; and whereby the sort device sorts into a third feature group (INCT) those features of the initial features which concern one possible connection type for the communication relation, the sort device transmits the initial features in the form of the first, second, and third feature groups to a processing device (MAT), the processing device inputs the initial features in the form of the first, second, and third feature groups into a decision matrix, and the processing device determines as output variables (OUTPUT) from this matrix the features required for the communication relation as second features.

In accordance with a further aspect of the invention there is provided a terminal (TER) with which features required for a communication relation can be determined and in which initial features which are required for classification of the communication relation can be inputted on an input device (INTER), characterized in that the terminal has a sort device (CPU, MEM) and a processing device (CPU, MEM) which are constructed and joined together and with the input device in such manner that they interact with each other and with the input device in the following manner: the input device transmits the initial features to the sort device, the sort device sorts the initial features into feature groups whereby the sort device sorts into a first feature group the features of the initial features which concern at least two of the communications partners to be involved in the communication relation, whereby the sort device sorts into a second feature group the features of the initial features which concern at least one data type to be transmitted in the framework of the communication relation, and whereby the sort device sorts into a third feature group the features of the initial features which concern one possible connection type for the communication relation, the sort device transmits the initial features in the form of the first, second, and third feature groups to the processing device, the processing device inputs the initial features in the form of the first, second, and third feature groups into a decision matrix, and the processing device determines as output variables from this matrix the features required for the communication relation as second features.

The invention further comprises a node (NODE) with which features required for a communication relation can be determined and in which initial values which are required for a classification of the communication relation can be inputted on an input device (INTER) characterized in that the node has a sort device (CPU, MEM) and a processing device (CPU, MEM) which are constructed and joined together and with the input device in such manner that they interact with each other and with the input device in the following manner: the input device transmits the initial features to the sort device, the sort device sorts the initial features into feature groups whereby the sort device sorts into a first feature group the features of the initial features which concern at least two of the communications partners to be involved in the communication relation, whereby the sort device sorts into a second feature group the features of the initial features which concern at least one data type to be transmitted in the framework of the communication relation, and whereby the sort device sorts into a third feature group the features of the initial features which concern one possible connection type for the communication relation, the sort device transmits the initial features in the form of the first, second, and third feature groups to the processing device, the processing device inputs the initial features in the form of the first, second, and third feature groups into a decision matrix, and the processing device determines as output variables from this matrix the features required for the communication relation as second features.

The invention still further comprises a program module (PRG) with which features required for a communication relation can be determined and in which initial features can be inputted through an input functional unit (ST1) which are necessary for a classification of the communication relation characterized in that the program module has a sort functional unit (ST2) and a processing functional unit (ST4, ST5, ST6) which are constructed and joined together and to the input functional unit in such manner that they interact with each other and with the input functional unit in the following manner: the input functional unit transmits the initial features to the sort functional unit, the sort functional unit sorts the initial features into feature groups whereby the sort functional unit sorts into a first feature group the features of the initial features which concern at least two of the communications partners to be involved in the communication relation, whereby the sort functional unit sorts into a second feature group the features of the initial features which concern at least one data type to be transmitted in the framework of the communication relation, and whereby the sort functional unit sorts into a third feature group the features of the initial features which concern one possible connection type for the communication relation, the sort functional unit transmits the initial features in the form of the first, second, and third feature groups to the processing functional unit, the processing functional unit inputs the initial features in the form of the first, second, and third feature groups into a decision matrix, and the processing functional unit determines as output variables from this matrix the features required for the communication relation as second features.

According to a yet further aspect of the invention, there is provided a user interface (UI) for a telecommunications facility whereby features required for a communication relation can be determined with the user interface and whereby the initial features can be inputted at the user interface to an input device (TAR) as input variables which are required for a classification of the communication relation, characterized in that the user interface has a sort device and a processing device which are constructed and joined together and with the input device in such manner that they interact with each other and with the input device in the following manner: the input device transmits the initial features to the sort device, the sort device sorts the initial features into feature groups whereby the sort device sorts into a first feature group the features of the initial features which concern at least two of the communications partners to be involved in the communication relation, whereby the sort device sorts into a second feature group the features of the initial features which concern at least one data type to be transmitted in the framework of the communication relation, and whereby the sort device sorts into a third feature group the features of the initial features which concern one possible connection type for the communication relation, the sort device transmits the initial features in the form of the first, second, and third feature groups to the processing device, the processing device inputs the initial features in the form of the first, second, and third feature groups into a decision matrix, and the processing device determines as output variables from this matrix the features required for the communication relation as second features.

Additional advantageous configurations of the invention will be apparent from the description below and the appended claims.

BRIEF DESCRIPTION OF THE DRAWINGS

The invention and its advantages are presented below on the basis of an exemplary embodiment with the aid of the drawings, wherein:

FIG. 2 shows a decision matrix DEC which can be utilized for application of the method according to the invention.

DETAILED DESCRIPTION OF THE INVENTION

Figure 1:
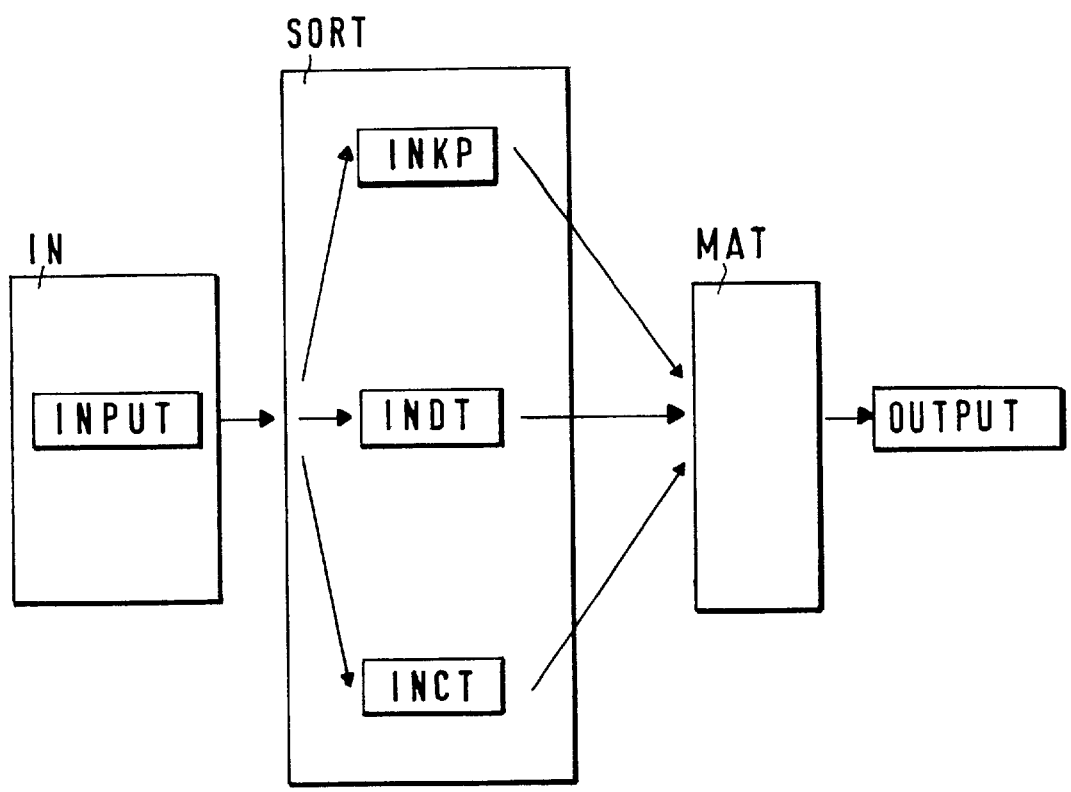
FIG. 1 shows a very schematic arrangement for carrying out the method according to the invention and with an input device IN, a sort device SORT, and a processing device MAT.

In FIG. 1, a very schematic arrangement is depicted on the basis of which the method according to the invention can be depicted by way of example; a more detailed depiction of the invention will be explained later on the basis of equipment and machinery of a telecommunications facility. Input data INPUT are sensed by an input device IN. Input device IN can, for example, be a graphical user interface or a keyboard. The input data INPUT concerns data which are required for a communication relation, for example a telephone number or an e-mail address of a desired communications partner, a specification that speech data are to be sent, and a specification that it is also acceptable for the data to reach the communication partner with a delay. Input data INPUT is then transferred from input device IN to a sort device SORT, indicated by an arrow, which suggests the data flow of input data INPUT to sort device SORT. sort device SORT then sorts input data INPUT into groups of data in that it determines that the individual components of input data INPUT belong to a first data group INKP or to a second data group INDT or to a third data group INCT. The process of grouping is illustrated with three arrows which indicate the path of input data INPUT into the individual data groups INKP, INDT, and INCT. In the first data group INKP, those components of input data INPUT of sort device SORT are grouped which have features which concern the communications partners participating in the communication relation. In the above example, the telephone number and the e-mail address of the desired communications partner are sorted into this first data group INKP by sort device SORT. In the second data group INDT, those [components] of input data INPUT are sorted by sort device SORT which concern the data types which are to be transmitted in the framework of the communication relation, in the above example the specification that speech data is to be sent. Finally, the sort device SORT assigns those [components] of the input data INPUT to the third data group INCT which concern a possible connection type of the desired communication relation, thus in the example the specification that it is also acceptable for the data to reach the communications partner with a delay.

Sort device SORT then forwards input data INPUT sorted into data groups INKP, INDT, and INCT to a processing device MAT. Through three separate arrows, it is made clear in FIG. 1 that input data INPUT reaches processing device MAT in three pre-sorted data streams which can be distinguished through a reference to one of the three data groups INKP, INDT, and INCT. Such a reference can, for example, be a qualifier which the sort device SORT adds to the individual components of input data INPUT prior to transmission to processing device MAT and which identifies the data as belonging to one of data groups INKP, INDT, and INCT.

Processing device MAT can, with the help of a decision matrix, convert data groups INKP, INDT, and INCT received by it into output data OUTPUT which contains the features of a communication relationship which fulfill the requirements specified by input data INPUT. With the aid of output data OUTPUT, the desired telecommunication relation can then be established by a telecommunications facility or an existing communication relation can be modified. Such output data can, for example, also direct that for the fulfillment of specified requirements, a communications connection be requested from a provider of telecommunications services that data to be transmitted be converted into a predetermined data format as a result of limited evaluation capability in the telecommunications facility of the communications partner and that these data be provided with an identification prior to transmission so that in the receiving telecommunications facility, it can arrive at a data sink suitable for the data.

An example of a particularly simple decision matrix, designated decision matrix DEC, is depicted in FIG. 2. The columns of decision matrix DEC are marked from left to right with indices S1, S2, S3, S4, and S5. The rows of decision matrix DEC bear from top to bottom reference characters RKP, RDT, and RCT as well as ROUTPUT which correlate to the designations of data groups INKP, INDT, and INCT, known from FIG. 1, as well as output data OUTPUT. In rows RKP, RDT, and RCT, feature indices explained below in greater detail are entered, each of which refer to features which can have data from data groups INKP, INDT, and INCT known from FIG. 1. The bottom row of decision matrix DEC shows feature groups which contain all features which the data known from FIG. 1 as output data OUTPUT likewise bear.

In row RKP in decision matrix DEC, by way of example, the telephone numbers known from the above example of the desired communications partner are entered as feature index ADD1 in columns S2, S4, and S5 and its e-mail address as feature index ADD2 in column S3. It would also be possible, however, to enter under feature index ADD1 the name of a first, and under feature index ADD2 the name of a second communications partner in the decision matrix DEC and then to obtain from decision matrix DEC the telephone numbers, e-mail addresses, or telefax numbers which are associated with feature indices ADD1 and ADD2. In next lower row RDT in decision matrix DEC, the data types to be transmitted are entered, by way of example in columns S2 and S4 a feature index VOICE which indicates speech data, and in columns S3 and S5 a feature index PICT, which characterizes image data. The row RCT below it, which concerns a possible connection type of the desired communication, contains in column S2 a feature index DIRECT, which indicates a direct transmission of data, and a feature index DELAY which indicates the permission for a delayed transmission of data, in columns S3, S4, and S5. The lowest row ROUTPUT of decision matrix DEC contains feature groups by the names of OUT1, OUT2, OUT3, and OUT4. These feature groups contain all features which are necessary for a communication relation which fulfills the requirements specified in a particular column. Thus, for example, feature group OUT1 can describe a direct connection to a telephone, feature group OUT2 can describe an e-mail data transfer, feature group OUT3 can describe a connection to a voice mailbox, and the feature group OUT4 can describe a connection to a fax machine.

It will be assumed below that processing device MAT known from FIG. 1 uses decision matrix DEC as [its] decision matrix. If processing device MAT now contains input data pre-sorted by sort device SORT into data groups INKP, INDT, and INCT, processing device MAT can compare the features contained in this input data with the features of the feature indices of decision matrix DEC. Sort device SORT compares the input data of first data group INKP with the feature index of row RKP, the input data of second data group INDT with feature index of row RDT, and input data of third data group INCT with the feature indices of row RCT. If the input data of the particular data groups INKP, INDT, and INCT agree with the corresponding feature indices of rows RKP, RDT, and RCT in one of columns S2, S3, S4, or S5, processing device MAT reads out the feature group OUT1, OUT2, OUT3, or OUT4 specified in this column and forms from these features the output data OUTPUT. If the subscriber number of a desired communications partner is contained in the input data with respect to first data group INKP; with respect to second data group INDT, a specification that speech data is to be transmitted;

and with respect to third data group INCT, an authorization that the data to be transmitted can also be transmitted with a delay, then processing device MAT determines through comparison that these requirements are fulfilled by the feature indices of column S4. Then processing device MAT reads out feature group OUT3 specified in column S4 and generates from its features output data OUTPUT which as stated describes a connection to a voice mailbox. If the input data with respect to third data group INCT contained, instead of an approval for delayed data transmission, an order for direct, undelayed data transmission, processing device MAT would have determined upon comparison of the input data with the feature indices of rows RKP, RDT, and RCT that the requirements of the input data were fulfilled through the specifications of column S1 and then output data OUTPUT would be formed with the features of feature group OUT.

Decision matrix DEC from FIG. 2, as already mentioned, is for reasons of a clear description a particularly simple variant of a decision matrix. Significantly more detailed forms of a decision matrix can be formed at any time according to the particular requirements.

Decision matrix DEC can, for example, be expanded by additional columns in which additional features of data groups INKP, INDT, and INCT are entered in tripartite groups and output data OUTPUT derived therefrom. Decision matrix DEC can also be broken down into a decision tree with individual "if-then" decision steps which then can be converted, for example, into a computer program.

A communications partner can be identified in addition to his address by the means available to him, for example through means for the use of various transmission media or through being having software for receiving or sending certain types of data. Several persons can also be selected as communications partners. The type of connection describes whether the communications partner must be present for the communication (on-line) or not (off-line), for example on-line for a conversation and off-line for data which will be evaluated later. It is also possible to request via type of connection, for example, a constant or a dynamically adapting transmission rate in a certain amount. Through type of data, "finite" data (for example, data file) or "infinite" data (for example, conversation) can be distinguished. By the concepts "finite" and "infinite" it is to be understood that the size of a data file is already known even before it is sent, while in the case of a conversation, its duration generally cannot be foretold. Distinctions such as different file formats are possible under the concept type of data.

For purposes of clarity, sort device SORT and processing device MAT are depicted in FIG. 1 as separate devices and their functions are explained. In practice, however, both devices can be combined. For example, a processor for data processing can perform both the functions of sort device SORT and those of processing device MAT if the necessary command sequences for performing [them] are fed to it as needed. The functions of sort device SORT and the functions of processing device MAT are advantageously prepared as separate programs or program functions. With the program function for sort device SORT, the processor then can pre-sort the input data into data groups INKP, INDT, and INCT and can write them in pre-sorted form in a memory. Following this, the processor can take the pre-sorted data from the memory and can further process it in the described manner using the program function of processing device MAT.

Figure 3:
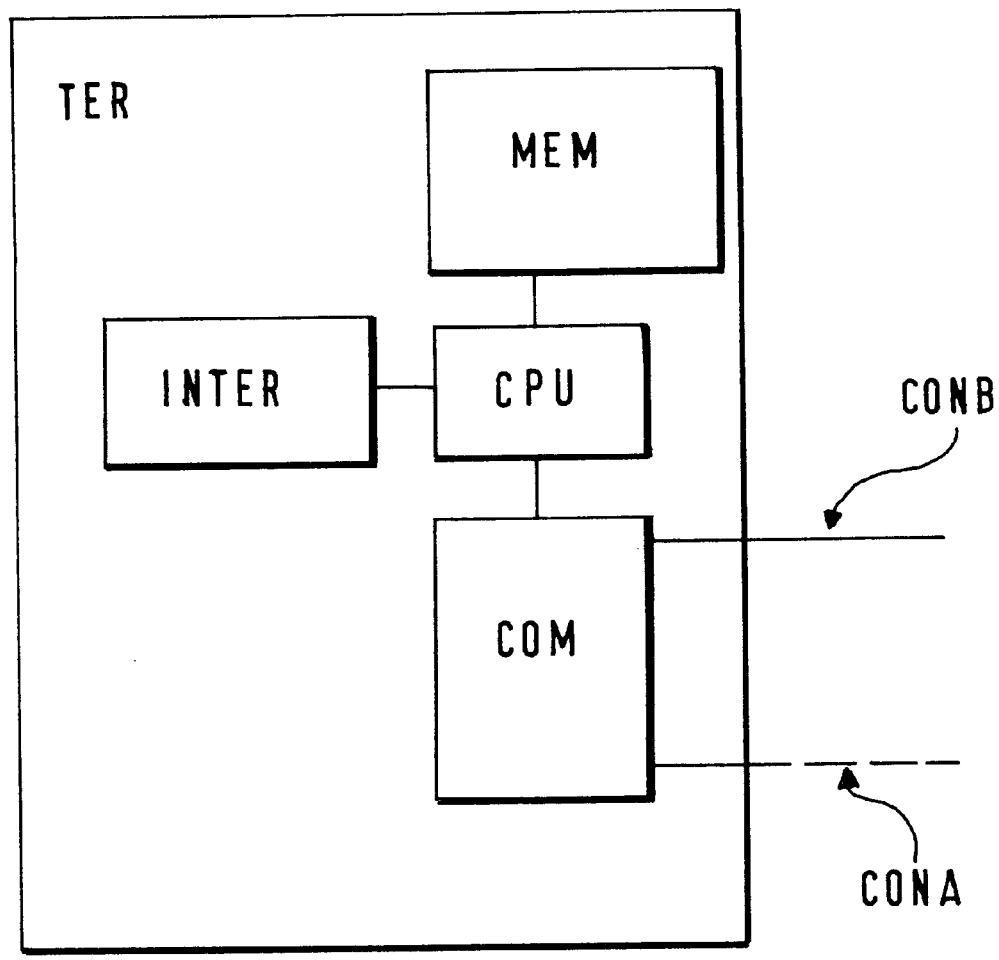
FIG. 3 shows a terminal TER according to the invention which contains an input device INTER, a control means CPU, a memory MEM, and a communications interface COM through which a communications path CONA or a communications path CONB can be activated.

In FIG. 3, a terminal TER according to the invention is depicted through which communications relationships can be established and maintained. Terminal TER can, for example, be a convenient telephone set through which additional communications are also possible which extend beyond pure telephony, for example communication with the internet. Terminal TER, however, can also be a personal computer over which telephony and fax transmission as well as modern communications forms such as e-mail services and internet communications are possible. Additional conformations of terminal TER are also conceivable, for example that of a universally applicable "personal communicator" with which one can use various telecommunications networks, mobile telephone networks and various degrees of services offered. Precisely here the invention proves to be very useful because the extensive potential of such a "personal communicator," often very difficult for a subscriber to use, can, as will be clearly shown below, be simply, efficiently, and beneficially utilized.

Terminal device TER has a communications interface COM over which terminal TER can activate two different communications paths CONA and CONB which, for example, represent additional communications paths not depicted in FIG. 3. The depiction of different communications paths CONA and CONB as separate routes serves purely for illustrative purposes. While it is quite possible in practice for two different communications media to be signified by communications paths CONA and CONB, for example two physically separated subscriber lines of a telecommunications network, it is equally possible that on one and the same medium, for example on one subscriber line, several communications forms may be carried out alternately or simultaneously. For example, a telephone connection can be maintained on such a subscriber line on one channel and at the same time an e-mail can be sent on another channel. This is possible, for example, if the subscriber line is part of an ISDN telecommunications network.

Communications interface COM is controlled by a control means CPU. Control means CPU instructs communications interface COM how communications paths CONA and CONB are to be selected and used. Control means CPU can, for example, be a processor, which receives command sequences from a memory MEM, which is depicted in FIG. 3. Control means CPU can use the memory MEM to save data. As will be explained later, control means CPU can perform both the functions of sort device SORT known from FIG. 1 as well as those of processing device MAT.

In addition, an input device INTER is depicted in FIG. 3 which corresponds in function to input device IN known from FIG. 1. Thus data which are necessary for a communication relation are in like manner determined by input device INTER. Input device INTER can be, for example, a simple key pad on which for example a name or a telephone number of a desired communications partner and a keystroke sequence as an indication of the data types to be transmitted in the framework of the communication relation can be inputted. However, if extensive communications capabilities are available, for example on a personal computer specially equipped for telecommunication or on a "personal communicator," input device INTER is advantageously a graphical user interface which can be operated using a so-called mouse. For purposes of simplification, the configuration form of input device INTER as graphical user interface will be described below as a pure input interface. However, it is known to a person skilled in the art that a graphical user interface is a tightly interlocked interplay of input means, for example the mouse and the key pad, and of output means, for example a monitor or a display. In addition, it is not depicted in detail that the input means and output means in practice can be controlled by a control means, for example control means CPU, with the aid of command sequences which the control means draws from a memory, for example memory MEM. A graphical user interface will therefore be considered to begin with as a self-contained input device.

Figure 4:
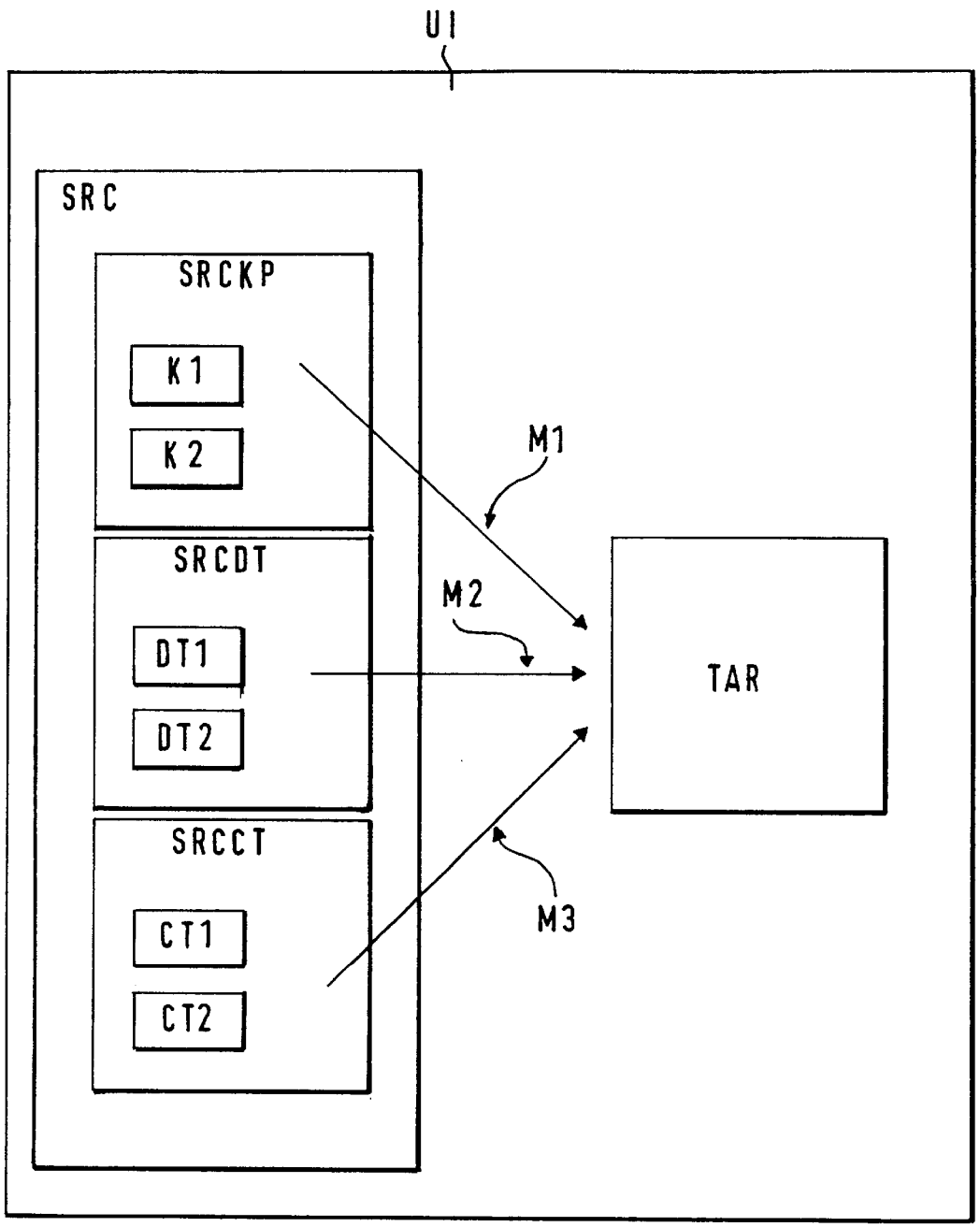
FIG. 4 shows a user interface UI according to the invention.

A possible embodiment in schematic form of such a graphical user interface is depicted as graphical user interface UI in FIG. 4. The depiction in FIG. 4 is restricted to a possible configuration of the graphical output of the user interface UI, for example on a monitor. Means for input of data, for example a key pad and a mouse, and means for control of the user interface, for example a processor and a memory, are not separately shown in FIG. 4. User interface UI is roughly subdivided into two main fields which are designated source field SRC and target field TAR. In source field SRC, elements are depicted which are representative for component parts of input data INPUT known from FIG. 1. Elements K1 and K2 are each graphical representations, thus symbols or so-called icons for a possible communications partner. Such a symbol can, for example, be a picture of the partner or an entry in the nature of a graphically-rendered notebook. Alongside elements K1 and K2, user interface UI can also have additional elements, not depicted in FIG. 4, which each can stand for additional communications partners or also for different communications possibilities which are available to a communications partner, for example a communications possibility using a mobile telephone terminal and a communications possibility using a wire-bound fax machine. In addition it is possible, for example, for an image of the particular communications partner to be displayed on user interface UI as an icon which represents the communications partner along with a mobile telephone terminal or a fax machine. The use of elements K1 and K2 and additional yet-to-be-explained elements of user interface UI will be explained in detail later.

In an extremely advantageous embodiment of the invention, elements K1 and K2 are already combined in a field SRCKP in which there are only elements which symbolize communications partners participating in the communication relation and thus belong to data group INKP known from FIG. 1. In a further field SRCDT, elements are depicted which represent input data from data group INDT known from FIG. 1, thus characterizing data types to be transmitted in the framework of the communication relation.

Thus, for example, element DT1 can represent a specification that speech data is to be sent, and element DT2 can be a symbol for a data file to be sent. Logically, elements are then combined in a field SRCCT which serve as symbols for data from data group INCT which relate to a possible connection type of the desired communication relation. Element CT1 can, for example, be configured in the form of a mail symbol and thus indicate that the data to be sent can arrive at the communications partner with a delay in an off-line communication. With the aid of element CT2, it can be established on the other hand, for example, that communications must be carried out in an on-line connection because speech information is to be exchanged in the framework of a conversation or because a data exchange sequence with or without immediate acknowledgement of received data is requested. The function of element CT2 becomes apparent to a user, for example, in that an image of a telephone is used for the element. The subdivision of source field SRC into the fields SRCKP, SRCDT, and SRCCT analogous with data groups INKP, INDT, and INCT and the pre-sorting of elements K1, K2, DT1, DT2, CT1 and CT2 in these fields provides a clear representation for the user and allows him, as will be explained in greater detail below, to input in a structured manner input data INPUT into terminal TER. While this pre-sorting is advantageous, it is not mandatory since said elements can also be distributed in unstructured manner in source field SRC or can be arranged according to other aspects. For example, groups of input data can be formed within source field SRC, each with an element from data groups INKP, INDT, and INCT, which are often used by a user of user interface UI and therefore are prepared for use already sorted.

From source field SRC, the elements K1, K2, DT1, DT2, CT1, and CT2 can be selected and brought to target field TAR, for example with the aid of a mouse in the form of a so-called "drag-and-drop" mouse action in which an element is marked using the mouse and is "dragged" to a destination, where it is "dropped." Such a procedure with a mouse is well known to every user of a graphically oriented operating system for a personal computer, for example Windows of the Microsoft company. The mouse actions are suggested in FIG. 4 through arrows which are designated mouse action M1, mouse action M2, and mouse action M3. From source field SRC, element K1 or K2 can be selected through mouse action M1, elements DT1 and DT2 can be selected through mouse action M2, and elements CT1 and CT2 through mouse action M3 from source field SRC [and] can be dragged to target field TAR. Additional fields not depicted in FIG. 4 are possible on user interface UI, for example a "delete field," made recognizable by an icon in the form of a garbage can. If a user wants to remove an element from target field TAR because he wants to drag another element of the same data group into target field TAR instead of it, he must merely drag the element to be removed from target field TAR to the "delete" field.

Through one of mouse actions M1, M2, or M3, the user brings one of elements K1, K2, DT1, DT2, CT1, and CT2 to target field TAR. Target field TAR then detects the three elements selected by the user in this manner. Thus all features necessary for classification of a communication relation are defined. However, it is also possible for more than one element to be selected from data groups INKP, INDT, and INCT. Thus, for example, a communication relation can be desired not only with one communication partner, but rather a conference connection with two or more communications partners can be requested. The user can then, for example, drag both elements K1 and K2 from the field SRCKP into target field TAR and thus signal the desire for a simultaneous communication relation with both communications partners symbolized with these elements. If the user selects several elements from source field SRC the functions of which conflict, for example the elements CT1 and CT2 which stand for offline and for on-line communication, respectively, and drags these elements using the mouse into target field TAR, the user interface can always accept the last of the competing inputs as valid or it can call the attention of the user to the error by means of a message and can request a correct input.

Advantageously, user interface UI checks whether all elements necessary for a classification of a communication relation are contained in target field TAR before user interface UI continues with processing of the features which are described by the elements contained in target field TAR. In necessary, user interface UI requests the user to enter missing elements or adds additional features itself which typically are combined with the features already selected by the user. The user can also be directed through suitable configuration and function of user interface UI to drag all elements required for classification of a communication relation from source field SRC into target field TAR. For this purpose, target field TAR can be subdivided into target subfields which correspond to fields SRCKP, SRCDT, and SRCCT. If the user then drags an element out of one of fields SRCKP, SRCDT, SRCCT into the area of target field TAR and deposits it there, user interface UI arranges the particular element directly in the particular target subfield which corresponds to field SRCKP, SRCDT, or SRCCT from which the deposited element originated. In this way it is made easily apparent to the user as he views target field TAR which of the target subfields is not yet occupied by an element and accordingly which input must still be made so that all features required for classification of the desired communication relation are present.

When the user has input all features required for classification of the desired communication relation, user interface UI can independently begin further processing of the inputted data or can be instructed by the user to do so, for example, through depressing a key on the key pad belonging to user interface UI or through "pressing" a "start button" on user interface UI, i.e., through selecting and activating via mouse click a field of user interface UI not individually depicted in FIG. 4. With the aid of a control means of its own and of a memory of its own, user interface UI can fulfill the functions of sort device SORT known from FIG. 1 and of processing device MAT. User interface UI then sorts the input data into data groups INKP, INDT, and INCT, inputs the input data pre-sorted in this manner into a decision matrix and in this way extracts output data from the decision matrix. User interface UI transmits this output data to a telecommunications facility. On the basis of the output data, the telecommunications facility can develop the communication relation defined by the user on user interface UI or can modify an existing communication relation.

To the extent user interface UI, however, is a part of input device INTER and thus of terminal TER, user interface UI can transfer the input data input by the user directly from target field TAR to devices of terminal TER for further processing. It is not necessary that user interface then fulfill the functions of sort device SORT and of processing device MAT itself, but rather these functions can be shifted to devices of terminal TER. Such further action will be carried out below with reference to FIG. 3. After input device INTER has determined all features required for classification of a communication relation as input data, input device INTER passes this input data to control means CPU for further processing. [Control means CPU] loads the different command sequences from memory MEM according to which instructions control means CPU further processes the input data. Control means CPU sorts, as already explained in connection with FIG. 1, the input data into data groups INKP, INDT, and INCT, for example through control means CPU comparing the input data with features which classify data as belonging to the particular data groups and which are stored in memory MEM. Control means CPU inputs the data sorted according to data groups into a decision matrix, for example into decision matrix DEC known from FIG. 2, and determines the required features for the communication relation desired by the user. With the aid of these features, control means CPU then determines which of communication paths CONA or CONB conforms to the requirements of the user and, depending on the results, instructs communications interface COM to override communication path CONA or CONB. In FIG. 3, communications path CONB, for example, is used by communications interface COM and thus by terminal TER. Communications path CONB is therefore represented by an unbroken line.

The invention also is advantageous when it is not only used to develop a suitable communication relation but also for modification of an existing communication relation.

In the case of changing general conditions, for example in the case of transmission of an e-mail following a speech connection to one and the same communication partner, terminal TER can adapt the communication relation already used for transmission of speech to the requirements of e-mail transmission. For this purpose, the features required for classification of the desired e-mail transmission are determined by terminal TER with the aid of input device INTER even during the speech transmission. Terminal TER, more precisely control means CPU, sorts the new input data in the manner already explained into data groups INKP, INDT, and INCT and with the aid of the decision matrix then extracts the output features for reconfiguring the communication relation which is to be suitable for transmission of the e-mail. After completion of the speech transmission, control means CPU then instructs communications interface COM to modify the existing communication relation according to the detected output features for an e-mail transmission. For this purpose, communication interface COM sends to the telecommunications facility, for example, an identification by means of which the telecommunications facility can recognize that the next data sent is not speech data but rather contains an e-mail and therefore should arrive at a different data sink within the telecommunications facility than the speech data.

Alongside the described input of features required for a communication relation to input device INTER, such features can also be exchanged between terminal TER and a partner terminal of like type, even without a user having given an order for the development of a communication relation to one of the two terminals. A terminal can, for example, communicate to the other that with the aid of a newly imported software it is ready to receive additional types of data which in the past could not be evaluated. The terminal that receives this message can, for example, modify the output variables outputted by its decision matrix in some combination of input variables. If for example on the basis of the past software status of the partner terminal, a conversion of data was necessary prior to the sending of data to the partner terminal, such a conversion can be omitted through the new software status.

Figure 5:
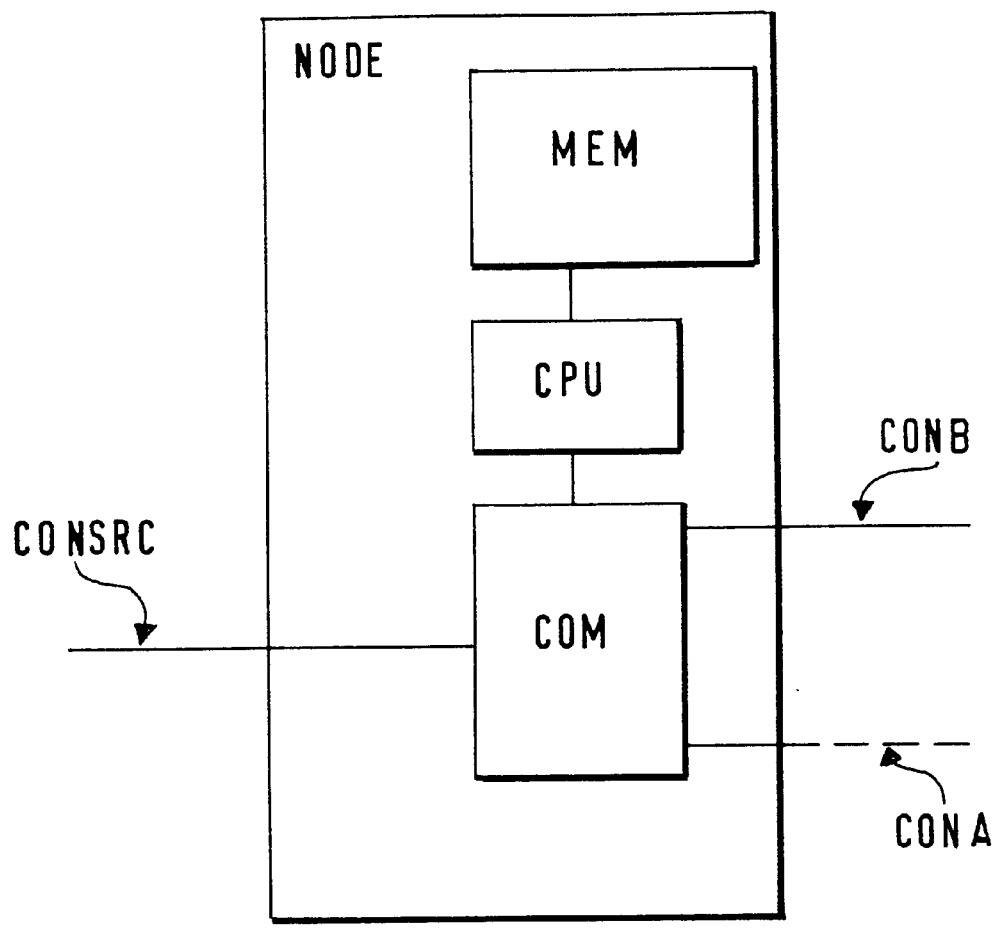
FIG. 5 shows a node NODE according to the invention which contains a control means CPU, a memory MEM, and a communications interface COM through which a communications path CONSRC, a communications path CONA, and a communications path CONB can each be connected with the others.

In FIG. 5, a node NODE is depicted which can be utilized in a telecommunications network. For purposes of simple representation of function and mode of operation, node NODE has essential components which are in principle already known from terminal TER from FIG. 3, specifically memory MEM, control means CPU, and communications interface COM. In practice, memory MEM and control means CPU have a greater capacity as components of node NODE than as components of terminal TER. Communications interface COM is expanded at node NODE by a communications path CONSRC which leads to an also not-depicted terminal or node. Communications interface COM can connect communications path CONSRC to communications path CONA or CONB in alternating manner or simultaneously. Communications interface COM can, for example, be a switching matrix. Communications connections CONSRC, CONA, and CONB, for example, represent additional communications connections not depicted in FIG. 5. As already explained in connection with FIG. 3, communications connections CONA and CONB as well as communications path CONSRC are exemplary representations which can stand for various physical paths but also can stand for various communications forms. In contrast to terminal TER node NODE does not have a separately configured input device INTER. Instead of this, the features required for classification of a communication relation are transmitted to node NODE in the form of input data by a telecommunications path CONSRC, for example a terminal or a node, to communications interface COM and from there is further transferred to control means CPU. Communications interface COM and control means CPU then jointly fulfill a function comparable with the function of input device INTER, namely the determination of the required input data. Terminal serves here merely as an interface device for the detecting of input data for which, for example, a key pad or a user interface of the terminal is utilized.

Through the input data, node NODE is instructed to produce a communication relation going out from communication path CONSRC or to modify an existing communication relation going out from there. Control means CPU sorts the received input data according to instructions from command sequences loaded from memory MEM into data groups INKP, INDT, and INCT and load a decision matrix from memory into which control means CPU loads the pre-sorted input data. As output data from this decision matrix, control means CPU extracts [data] which are necessary for the establishment or modification of a communication relation going out from communications path CONSRC. According to the output data determined in this manner, control means CPU instructs communications interface COM, for example, to connect communications path CONSRC to communications path CONB.

As already explained, the functions of sort device SORT and of processing device MAT from FIG. 1 by control means CPU known from FIGS. 3 and 5 are carried out in cooperation with memory MEM through loading and executing command sequences. It is also possible, however, for a telecommunications facility which has a control means comparable with control means CPU and a memory comparable with memory MEM to be upgraded through command sequences stored in the memory which are readable and executable by the control means to carry out the invention. These command sequences ordinarily are coded in a programming language, for example the high-level language "C" or the object programming language "C++" and are compiled into a machine language which can be read and executed by the control means. If the program module according to the invention is divided into individual functional units, as will be explained later, these functional units are connected together after compiling by so-called "linking" so that the transitions and branches between the individual functional units, the so-called program jumps, can be comprehended by the control means during execution of the program module. The control means is by way of example a processor of a personal computer or of a telecommunications facility. The program module can be stored in the memory and there read by the control means for execution of command sequences. The memory can by way of example be a magnetic memory, for example a diskette or a hard drive, or it can be an electronic memory, for example an EEPROM (Electrical Erasable Programmable Read Only Memory) which is frequently utilized in telecommunications facilities. An example of such a program module is depicted as program module PRG in FIG. 6. In the following description of program module PRG it is assumed that program module PRG is stored in a memory of a telecommunications facility and is executed by a control means of such telecommunications facility.

Figure 6:
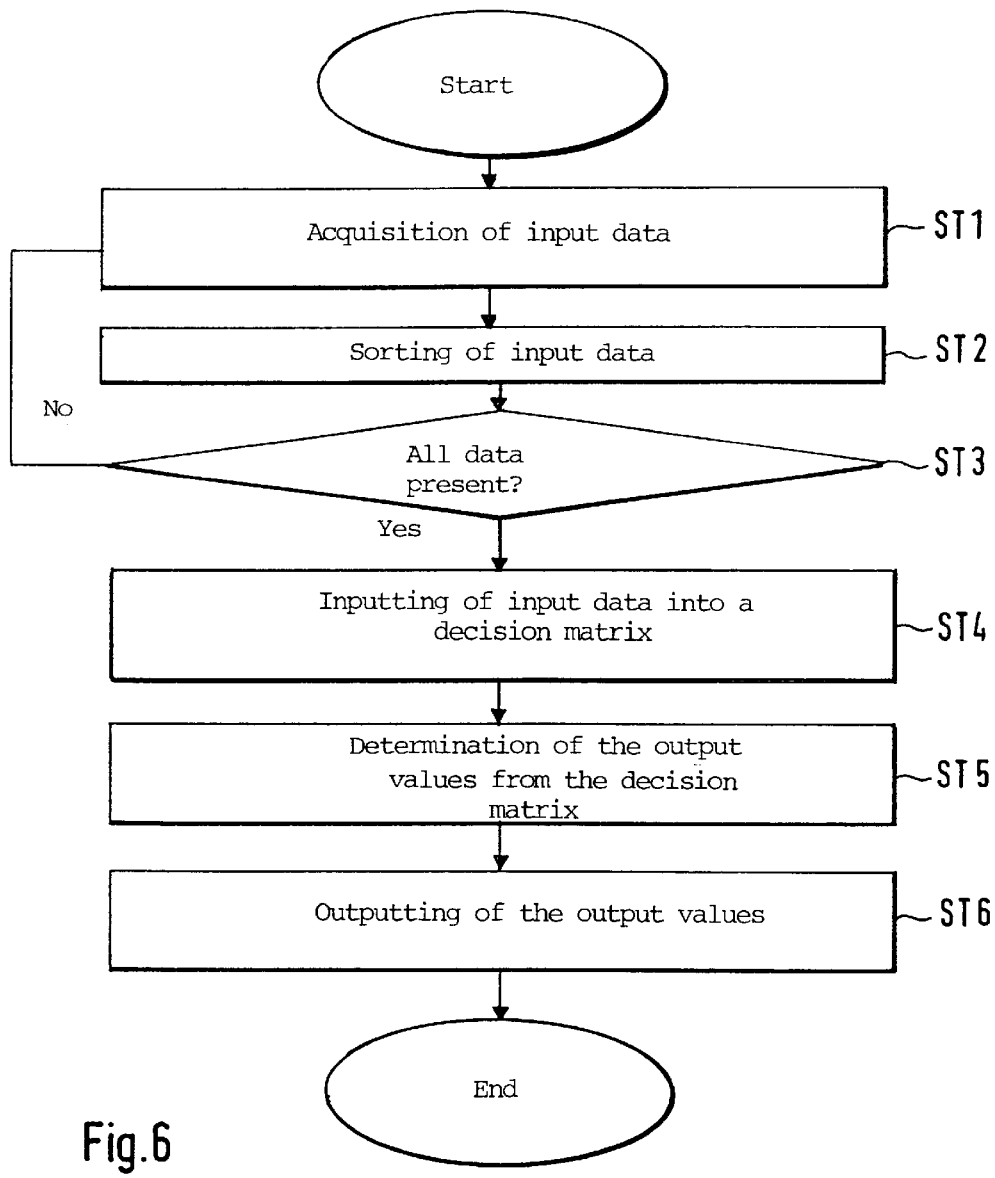
FIG. 6 shows a program module PRG according to the invention.

In the interest of an easily understandable presentation, program module PRG is depicted in FIG. 6 in the form of a flow chart in which individual steps are carried out. The individual steps each stand for a command or a series of commands which each form a functional unit, a so-called function. While this functional separation is practical, it is not absolutely necessary. Program module PRG can also serve as a single function for of a superimposed program for the development or modification of a communication relation.

Beginning with a start field, the program module in a step ST1 gathers the input data required for classification of a communication relation. For this purpose input means and output means, not depicted in FIG. 6, are triggered by the control means according to the instructions of step ST1. The instructions of step ST1 are united into an input functional unit, for example in a subprogram. The input data collected in this manner is sorted in a step ST2 into data groups INKP, INDT, and INCT known from FIG. 1. The instructions of step ST2 are bundled into a sort functional unit, for example likewise a program function. Following this, it is checked in an optional step ST3 whether an input data was collected for each of data groups INKP, INDT, and INCT. If an input data is missing, [the program] branches back to step ST1. If step ST3 is not contained in the program module, it is also possible for the input data to be offered by the input functional unit in step ST1 to one of the input means in such a form. For this purpose, the input means can be configured such that only a complete set of input data is offered for input at a time and can only be input by a user as a complete set. A complete set of input data contains an input datum from each of data groups INKP, INDT, and INCT, or the telecommunications facility, for example the node NODE shown FIG. 5 receives from a second communications device a complete set of input data for which the second telecommunications facility must ensure that in each case an input datum from the data groups INKP, INDT, and INCT is contained in a complete set. A further possibility for omission of step ST3 is provided if one input data is supplied from each of data groups INKP, INDT, and INCT in step ST1 by the input functional unit as a default value which can be optionally changed by a user through overwriting with a suitable desired input data, but which can also be accepted unchanged in step ST2.

After step ST3, the pre-sorted input data are inputted in a step ST4 into a decision matrix which can be incorporated into the command sequence of step ST4 as "if-then" decision steps, but which can also be stored as a separate data structure in the memory of the telecommunications facility. Then in step ST5, output values are determined from the decision matrix which characterize the communication relation desired per input in step ST1. Steps ST3, ST4, and ST5 are presented in FIG. 6 as discrete steps for clarity, but they can also easily be combined into one processing functional unit, in particular since branching is not necessary from any of these steps.

The output values determined in step ST5 are outputted in an optional step ST6, for example to an additional program module not shown in FIG. 6 which then with the aid of additional command sequences establishes the desired communication relation. It is also possible, however, that already in step ST5, with omission of step ST6, the output values determined are not outputted from the decision matrix but rather only an index is stored in the memory of the telecommunications facility which indicates the output values determined. This last variant is especially easy to realize if the decision matrix is not incorporated into the command sequence of step ST4 but rather is stored in the memory as a separate data structure. Then it is possible, for example, for a superimposed control program of the telecommunications facility which is calls program module PRG to read out the index and thus to access that memory location within the memory area of the decision matrix which contains the ascertained output values. With a step Ende which follows step ST6, the sequence of the program module ends.

What is claimed is:

1. A method, comprising:
    in a first telecommunications device, determining feature data, the first telecommunications device being located at a first end of a telecommunications link over which a first human communications partner transmits information data to a second human communications partner, wherein the feature data represent telecommunications link features desired by the first human communications partner, and wherein the feature data comprise:
        first feature data specifying a target address of a second telecommunications device, the second telecommunications device being located at a second end of the telecommunications link and being operated by the second human communications partner;
        second feature data specifying a type of the information data to be transmitted by the first human communications partner to the second human communications partner over the telecommunications link; and
        third feature data specifying whether the second human communications partner is to receive the information data transmitted from the first human communications partner immediately or after a predetermined period of time;
    transmitting the feature data to a sort device;
    in the sort device, sorting the first feature data into a first feature data group, sorting the second feature data into a second feature data group, and sorting the third feature data into a third feature data group;
    transmitting the feature data sorted in the sort device to a processing device, the processing device containing a decision matrix, wherein each column of the decision matrix contains a fixed combination of feature data entries and a fixed output data entry that represents the fixed combination of feature data entries;
    in the processing device, matching the first feature data, the second feature data, and the third feature data sorted in the sort device with a respective fixed combination of feature data entries contained in a respective column of the decision matrix;
    from the processing device, outputting the respective fixed output data entry that represents the matched, fixed combination of feature data entries; and
    in accordance with the respective fixed output data entry, generating the telecommunications link between the first human communications partner and the second human communications partner, the telecommunications link thereby having the telecommunications link features desired by the first human communications partner.

2. The method according to claim 1, wherein the first telecommunications device (IN) provides the feature data for selection as input variables (INPUT), which are already presorted in the form of the first, second, and third feature data groups.

3. A method according to claim 1, wherein the first telecommunications device (IN) checks whether at least one feature from each of the three feature data groups is determined as an input variable.

4. The method according to claim 1, wherein, beyond the determination of the second features, the second features determined by the processing device are utilized by a telecommunications facility for establishing a communications relation starting from such telecommunications facility.

5. The method according to claim 1, wherein the method is applied as a starting point for optimization of an existing communications relation in that the particular, currently available features of the feature data groups are exchanged between at least two of the communications partners participating in the communications relation, the features which are then required for the communication relation are determined, and the communication relation is modified according to these required features.

6. The method according to claim 1, wherein, for preparation of a possible communication relation, the feature data required for classification of such communication relation are exchanged between communication partner facilities participating in the communication relation, even if no order for the development of the communication relation has been issued to the communications partner facilities.

7. A terminal located at a first end of a telecommunications link over which a first human communications partner transmits information data to a second human communications partner, the terminal comprising:
    an input device configured to determine feature data, wherein the feature data represent telecommunications link features desired by the first human communications partner, and wherein the feature data comprise:
        first feature data specifying a target address of a second terminal, the second terminal being located at a second end of the telecommunications link and being operated by the second human communications partner;
        second feature data specifying a type of the information data to be transmitted by the first human communications partner to the second human communications partner over the telecommunications link; and
        third feature data specifying whether the second human communications partner is to receive the information data transmitted from the first human communications partner immediately or after a predetermined period of time;
    a sort device configured to receive the feature data from the input device and configured to sort the first feature data into a first feature data group, to sort the second feature data into a second feature data group, and to sort the third feature data into a third feature data group; and
    a processing device configured to receive the feature data sorted in the sort device, the processing device containing a decision matrix;
    wherein each column of the decision matrix contains a fixed combination of feature data entries and a fixed output data entry that represents the fixed combination of feature data entries;
    wherein the processing device is configured to match the first feature data, the second feature data, and the third feature data sorted in the sort device with a respective fixed combination of feature data contained in a respective column of the decision matrix; and wherein the processing device is configured to output the respective fixed output data entry that represents the matched, fixed combination of feature data entries, so that, in accordance with the respective fixed output data entry, the telecommunications link is generated between the first human communications partner and the second human communications partner, the telecommunications link thereby having the telecommunications link features desired by the first human communications partner.

8. A node of a telecommunications link over which a first human communications partner transmits information data to a second human communications partner, the node comprising:
- an input device configured to receive feature data, determined by a first telecommunications device, wherein the first telecommunications device is located at one end of the telecommunications link, wherein the feature data represent telecommunications link features desired by the first human communications partner, and wherein the feature data comprise:
  - first feature data specifying a target address of a second telecommunications device, the second telecommunications device being located at a second end of the telecommunications link and being operated by the second human communications partner;
  - second feature data specifying a type of the information data to be transmitted by the first human communications partner to the second human communications partner over the telecommunications link; and
  - third feature data specifying whether the second human communications partner is to receive the information data transmitted from the first human communications partner immediately or after a predetermined period of time;
- a sort device configured to receive the feature data from the input device and configured to sort the first feature data into a first feature data group, to sort the second feature data into a second feature data group, and to sort the third feature data into a third feature data group; and
- a processing device configured to receive the feature data sorted in the sort device, the processing device containing a decision matrix;
- wherein each column of the decision matrix contains a fixed combination of feature data entries and a fixed output data entry that represents the fixed combination of feature data entries;
- wherein the processing device is configured to match the first feature data, the second feature data, and the third feature data sorted in the sort device with a respective fixed combination of feature data contained in a respective column of the decision matrix; and
- wherein the processing device is configured to output the respective fixed output data entry that represents the matched, fixed combination of feature data entries, so that, in accordance with the respective fixed output data entry, the telecommunications link is generated between the first human communications partner and the second human communications partner, the telecommunications link thereby having the telecommunications link features desired by the first human communications partner.

9. A program module of a telecommunications link over which a first human communications partner transmits information data to a second human communications partner, the node comprising:
- an input functional unit configured to receive feature data determined by a first telecommunications device, wherein the first telecommunications device is located at one end of the telecommunications link, wherein the feature data represent telecommunications link features desired by the first human communications partner, and wherein the feature data comprise:
  - first feature data specifying a target address of a second telecommunications device, the second telecommunications device being located at a second end of the telecommunications link and being operated by the second human communications partner;
  - second feature data specifying a type of the information data to be transmitted by the first human communications partner to the second human communications partner over the telecommunications link; and
  - third feature data specifying whether the second human communications partner is to receive the information data transmitted from the first human communications partner immediately or after a predetermined period of time;
- a sort functional unit configured to receive the feature data from the input functional unit and configured to sort the first feature data into a first feature data group, to sort the second feature data into a second feature data group, and to sort the third feature data into a third feature data group; and
- a processing functional unit configured to receive the feature data sorted in the sort functional unit, the processing device containing a decision matrix;
- wherein each column of the decision matrix contains a fixed combination of feature data entries and a fixed output data entry that represents the fixed combination of feature data entries;
- wherein the processing functional unit is configured to match the first feature data, the second feature data, and the third feature data sorted in the sort functional unit with a respective fixed combination of feature data contained in a respective column of the decision matrix; and
- wherein the processing functional unit is configured to output the respective fixed output data entry that represents the matched, fixed combination of feature data entries, so that, in accordance with the respective fixed output data entry, the telecommunications link is generated between the first human communications partner and the second human communications partner, the telecommunications link thereby having the telecommunications link features desired by the first human communications partner.

10. A user interface of a telecommunications device located at a first end of a telecommunications link over which a first human communications partner transmits information data to a second human communications partner, the terminal comprising:
- an input device configured to determine feature data, wherein the feature data represent telecommunications link features desired by the first human communications partner, and wherein the feature data comprise:
  - first feature data specifying a target address of a second terminal, the second terminal being located at a second end of the telecommunications link and being operated by the second human communications partner;
  - second feature data specifying a type of the information data to be transmitted by the first human communications partner to the second human communications partner over the telecommunications link; and
  - third feature data specifying whether the second human communications partner is to receive the information data transmitted from the first human communications partner immediately or after a predetermined period of time;

a sort device configured to receive the feature data from the input device and configured to sort the first feature data into a first feature data group, to sort the second feature data into a second feature data group, and to sort the third feature data into a third feature data group; and a processing device configured to receive the feature data sorted in the sort device, the processing device containing a decision matrix;

wherein each column of the decision matrix contains a fixed combination of feature data entries and a fixed output data entry that represents the fixed combination of feature data entries;

wherein the processing device is configured to match the first feature data, the second feature data, and the third feature data sorted in the sort device with a respective fixed combination of feature data contained in a respective column of the decision matrix; and wherein the processing device is configured to output the respective fixed output data entry that represents the matched, fixed combination of feature data entries, so that, in accordance with the respective fixed output data entry, the telecommunications link is generated between the first human communications partner and the second human communications partner, the telecommunications link thereby having the telecommunications link features desired by the first human communications partner.

11. A method, comprising:

in a first telecommunications device, determining feature data, wherein at least some of the feature data are manually entered into the first telecommunications device by a first human communications partner, wherein the first telecommunications device is located at a first end of a telecommunications link over which the first human communications partner transmits information data to a second human communications partner, wherein the feature data represent telecommunications link features desired by the first human communications partner, and wherein the feature data comprise:

first feature data specifying a target address of a second telecommunications device, the second telecommunications device being located at a second end of the telecommunications link and being operated by the second human communications partner;

second feature data specifying a type of the information data to be transmitted by the first human communications partner to the second human communications partner over the telecommunications link; and third feature data specifying whether the second human communications partner is to receive the information data transmitted from the first human communications partner immediately or after a predetermined period of time;

transmitting the feature data to a sort device;

in the sort device, sorting the first feature data into a first feature data group, sorting the second feature data into a second feature data group, and sorting the third feature data into a third feature data group;

transmitting the feature data sorted in the sort device to a processing device, the processing device containing a decision matrix, wherein each column of the decision matrix contains a fixed combination of feature data entries and a fixed output data entry that represents the fixed combination of feature data entries;

in the processing device, matching the first feature data, the second feature data, and the third feature data sorted in the sort device with a respective fixed combination of feature data entries contained in a respective column of the decision matrix;

from the processing device, outputting the respective fixed output data entry that represents the matched, fixed combination of feature data entries; and in accordance with the respective fixed output data entry, generating the telecommunications link between the first human communications partner and the second human communications partner, the telecommunications link thereby having the telecommunications link features desired by the first human communications partner.

12. The method according to claim 11, wherein all of the feature data are manually entered into the first telecommunications device by the first human communications partner.

13. A terminal located at a first end of a telecommunications link over which a first human communications partner transmits information data to a second human communications partner, the terminal comprising:

an input device configured to determine feature data, wherein at least some of the feature data are manually entered into the input device by the first human communications partner, wherein the feature data represent telecommunications link features desired by the first human communications partner, and wherein the feature data comprise:

first feature data specifying a target address of a second terminal, the second terminal being located at a second end of the telecommunications link and being operated by the second human communications partner;

second feature data specifying a type of the information data to be transmitted by the first human communications partner to the second human communications partner over the telecommunications link; and third feature data specifying whether the second human communications partner is to receive the information data transmitted from the first human communications partner immediately or after a predetermined period of time;

a sort device configured to receive the feature data from the input device and configured to sort the first feature data into a first feature data group, to sort the second feature data into a second feature data group, and to sort the third feature data into a third feature data group; and a processing device configured to receive the feature data sorted in the sort device, the processing device containing a decision matrix;

wherein each column of the decision matrix contains a fixed combination of feature data entries and a fixed output data entry that represents the fixed combination of feature data entries;

wherein the processing device is configured to match the first feature data, the second feature data, and the third feature data sorted in the sort device with a respective fixed combination of feature data contained in a respective column of the decision matrix; and wherein the processing device is configured to output the respective fixed output data entry that represents the matched, fixed combination of feature data entries, so that, in accordance with the respective fixed output data entry, the telecommunications link is generated between the first human communications partner and the second human communications partner, the telecommunications link thereby having the telecommunications link features desired by the first human communications partner.

14. The terminal according to claim 13, wherein all of the feature data are manually entered into the input device by the first human communications partner.

15. A node of a telecommunications link over which a first human communications partner transmits information data to a second human communications partner, the node comprising:

an input device configured to receive feature data determined by a first telecommunications device, wherein at least some of the feature data are manually entered into the first telecommunications device by the first human communications partner, wherein the first telecommunications device is located at one end of the telecommunications link, wherein the feature data represent telecommunications link features desired by the first human communications partner, and wherein the feature data comprise:

first feature data specifying a target address of a second telecommunications device, the second telecommunications device being located at a second end of the telecommunications link and being operated by the second human communications partner;

second feature data specifying a type of the information data to be transmitted by the first human communications partner to the second human communications partner over the telecommunications link; and third feature data specifying whether the second human communications partner is to receive the information data transmitted from the first human communications partner immediately or after a predetermined period of time;

a sort device configured to receive the feature data from the input device and configured to sort the first feature data into a first feature data group, to sort the second feature data into a second feature data group, and to sort the third feature data into a third feature data group; and a processing device configured to receive the feature data sorted in the sort device, the processing device containing a decision matrix;

wherein each column of the decision matrix contains a fixed combination of feature data entries and a fixed output data entry that represents the fixed combination of feature data entries;

wherein the processing device is configured to match the first feature data, the second feature data, and the third feature data sorted in the sort device with a respective fixed combination of feature data contained in a respective column of the decision matrix; and wherein the processing device is configured to output the respective fixed output data entry that represents the matched, fixed combination of feature data entries, so that, in accordance with the respective fixed output data entry, the telecommunications link is generated between the first human communications partner and the second human communications partner, the telecommunications link thereby having the telecommunications link features desired by the first human communications partner.

16. The node according to claim 15, wherein all of the feature data are manually entered into the first telecommunications device by the first human communications partner.

17. A program module of a telecommunications link over which a first human communications partner transmits information data to a second human communications partner, the node comprising:

an input functional unit configured to receive feature data determined by a first telecommunications device, wherein at least some of the feature data are manually entered into the first telecommunications device by the first human communications partner, wherein the first telecommunications device is located at one end of the telecommunications link, wherein the feature data represent telecommunications link features desired by the first human communications partner, and wherein the feature data comprise:

first feature data specifying a target address of a second telecommunications device, the second telecommunications device being located at a second end of the telecommunications link and being operated by the second human communications partner;

second feature data specifying a type of the information data to be transmitted by the first human communications partner to the second human communications partner over the telecommunications link; and third feature data specifying whether the second human communications partner is to receive the information data transmitted from the first human communications partner immediately or after a predetermined period of time;

a sort functional unit configured to receive the feature data from the input functional unit and configured to sort the first feature data into a first feature data group, to sort the second feature data into a second feature data group, and to sort the third feature data into a third feature data group; and a processing functional unit configured to receive the feature data sorted in the sort functional unit, the processing device containing a decision matrix;

wherein each column of the decision matrix contains a fixed combination of feature data entries and a fixed output data entry that represents the fixed combination of feature data entries;

wherein the processing functional unit is configured to match the first feature data, the second feature data, and the third feature data sorted in the sort functional unit with a respective fixed combination of feature data contained in a respective column of the decision matrix; and wherein the processing functional unit is configured to output the respective fixed output data entry that represents the matched, fixed combination of feature data entries, so that, in accordance with the respective fixed output data entry, the telecommunications link is generated between the first human communications partner and the second human communications partner, the telecommunications link thereby having the telecommunications link features desired by the first human communications partner.

18. The program module according to claim 17, wherein all of the feature data are manually entered into the first telecommunications device by the first human communications partner.

19. A user interface of a telecommunications device located at a first end of a telecommunications link over which a first human communications partner transmits information data to a second human communications partner, the terminal comprising:

an input device configured to determine feature data, wherein at least some of the feature data are manually entered into the input device by the first human communications partner, wherein the feature data represent telecommunications link features desired by the first human communications partner, and wherein the feature data comprise:
  first feature data specifying a target address of a second terminal, the second terminal being located at a second end of the telecommunications link and being operated by the second human communications partner;
  second feature data specifying a type of the information data to be transmitted by the first human communications partner to the second human communications partner over the telecommunications link; and
  third feature data specifying whether the second human communications partner is to receive the information data transmitted from the first human communications partner immediately or after a predetermined period of time;
a sort device configured to receive the feature data from the input device and configured to sort the first feature data into a first feature data group, to sort the second feature data into a second feature data group, and to sort the third feature data into a third feature data group; and
a processing device configured to receive the feature data sorted in the sort device, the processing device containing a decision matrix;
  wherein each column of the decision matrix contains a fixed combination of feature data entries and a fixed output data entry that represents the fixed combination of feature data entries;
  wherein the processing device is configured to match the first feature data, the second feature data, and the third feature data sorted in the sort device with a respective fixed combination of feature data contained in a respective column of the decision matrix; and
  wherein the processing device is configured to output the respective fixed output data entry that represents the matched, fixed combination of feature data entries, so that, in accordance with the respective fixed output data entry, the telecommunications link is generated between the first human communications partner and the second human communications partner, the telecommunications link thereby having the telecommunications link features desired by the first human communications partner.

20. The user interface according to claim 19, wherein all of the feature data are manually entered into the first telecommunications device by the first human communications partner.

* * * * *